May 11, 1937.  C. Z. CASE  2,080,072
SPOOL FOR WINDING FILM THROUGH CAMERAS
Filed June 8, 1933  2 Sheets-Sheet 1
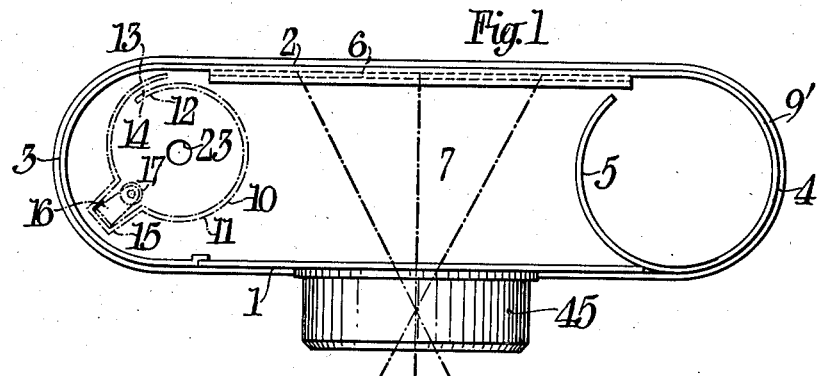
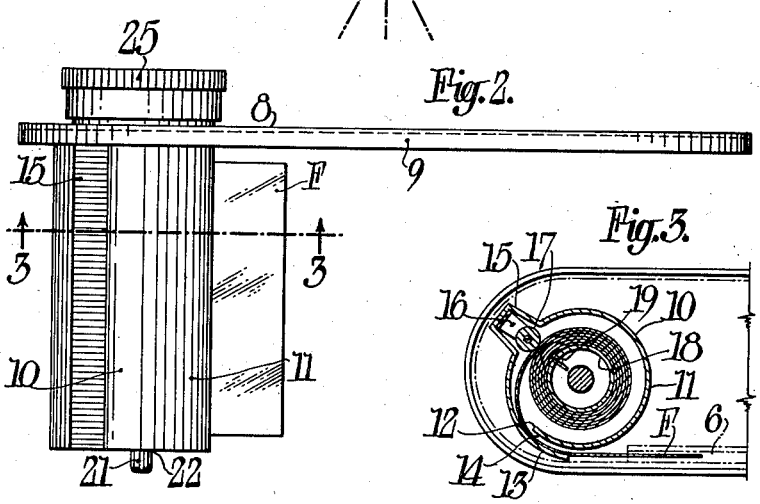
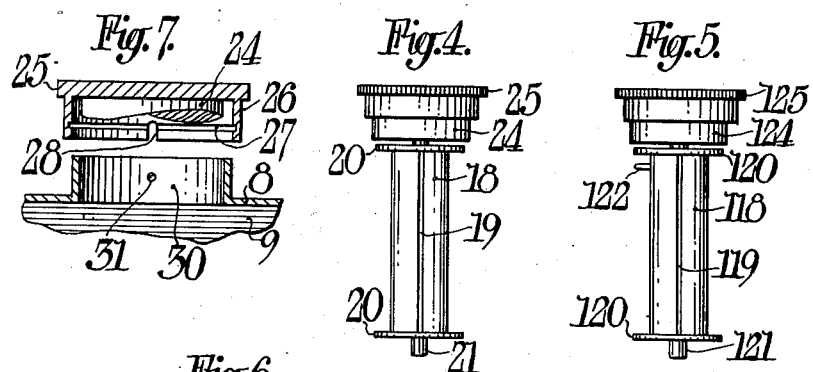
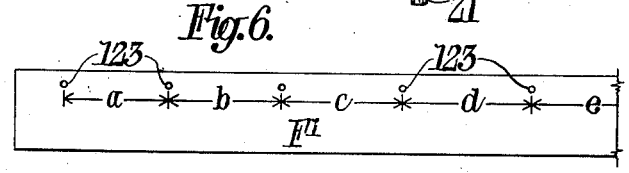
Inventor:
Charles Z. Case, May 11, 1937. C. Z. CASE 2,080,072
SPOOL FOR WINDING FILM THROUGH CAMERAS
Filed June 8, 1933 2 Sheets-Sheet 2
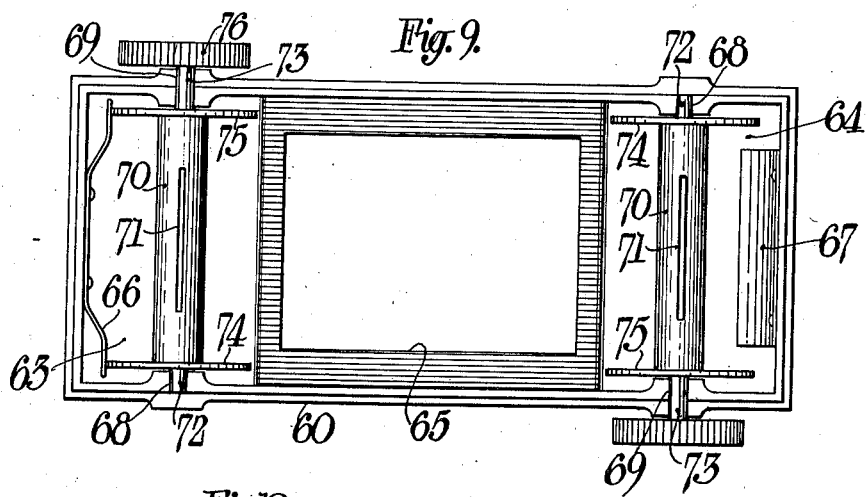
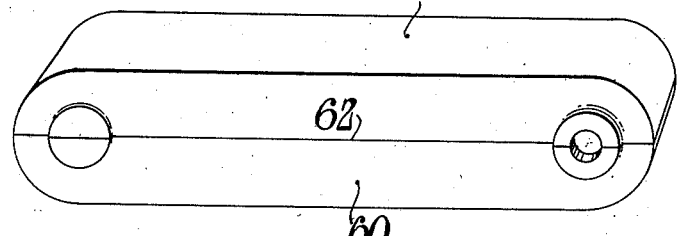
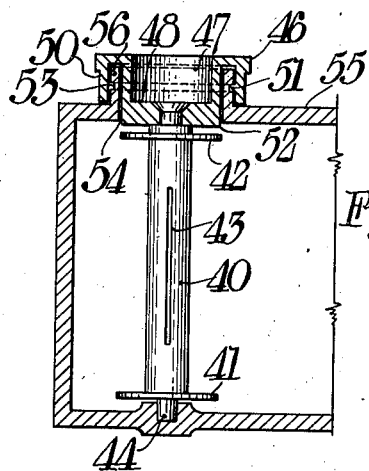
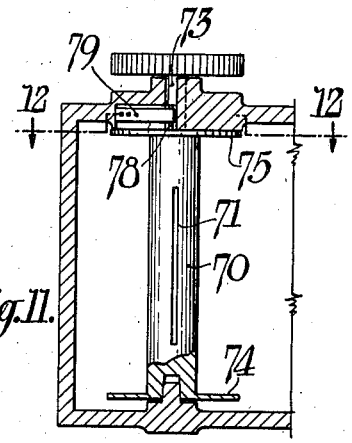
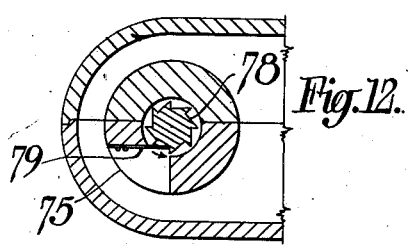
Inventor:
Charles Z. Case, Patented May 11, 1937

2,080,072

UNITED STATES PATENT OFFICE 2,080,072

SPOOL FOR WINDING FILM THROUGH CAMERAS

Charles Z. Case, London, England, assignor, by mesne assignments, to Eastman Kodak Company, Jersey City, N. J., a corporation of New Jersey Application June 8, 1933, Serial No. 674,873

2 Claims. (Cl. 242—71)

This invention relates to photography and more particularly to roll film apparatus designed primarily for small size photographic cameras.

One object of my invention is to provide a photographic assembly for use in cameras by which film may be wound through a camera past an exposure aperture. Another object of my invention is to provide a roll film camera in which the roll of film may be loaded on a spool and may be positioned in the camera through an aperture in the camera, the spool being provided with a means for winding the film past the exposure aperture. Another object of my invention is to provide a roll film for cameras in which the film moving means is attached to the film spool which is introduced into the camera so that a supplementary film winding key on the camera itself will be unnecessary. Another object of my invention is to provide a film spool and handle integrally connected into one unit, there being a means between the handle and one film spool flange for forming a light-tight connection with the camera body. Still another object of my invention is to provide a one-piece film spool in which there are three flanges mounted on a hub, two of the flanges being spaced apart a distance sufficient to admit and protect convolutions of film wound on the hub, and the third flange being spaced from one of the other flanges a comparatively short distance there being connected to the third flange a means for preventing light from entering between the third flange and the flanges which protect the film.

The disclosure of this application in Sheet 1 of the drawings is identical with the disclosure of my co-pending application Serial No. 580,473, for Film spools for roll-holding cameras, filed December 11, 1931, now Patent No. 1,921,559 of August 8, 1933. Some of the claims of this application are claims which were divided out of my co-pending application under a requirement for division.

Coming now to the drawings wherein like reference characters denote like parts throughout:

Fig. 1 is a top plan view of a camera with the top removed, especially constructed to take film spools designed in accordance with and embodying a preferred form of my invention.

Fig. 2 is a side elevation of a part of the camera which is not shown in Fig. 1—that is, the top which carries the spool chamber.

Fig. 3 is a fragmentary detail taken on line 3—3 of Fig. 2 through the spool holding chamber and also showing the relation of the spool holding chamber to the camera wall.

Fig. 4 is a side elevation of a film spool assembly constructed in accordance with an embodiment of my invention.

Fig. 5 is a view similar to Fig. 4 but showing a second embodiment of my invention.

Fig. 6 is a plan view of a length of film which may be used with the film assembly shown in Fig. 5.

Fig. 7 is a detail partially in section showing the means for retaining the spool holder in position in the camera and the means for rendering a light-tight connection between the spool handle and the camera.

Fig. 8 is a fragmentary sectional view showing a preferred means of mounting a spool in a camera and utilizing the spool retaining and light locking structure shown in Fig. 7.

Fig. 9 is a fragmentary sectional view through a camera constructed in accordance with another embodiment of my invention.

Fig. 10 is a perspective view of the camera body shown in Fig. 9.

Fig. 11 is a detail sectional view showing a part of a camera and spool constructed in accordance with still another embodiment of my invention, and Fig. 12 is a fragmentary detail sectional view on line 12—12 of Fig. 11.

Referring to Fig. 1 the present invention contemplates providing a camera which may consist of a front wall 1, a rear wall 2, and curved end walls 3 and 4. Wall 4 is continued around at 5 to form a cylindrical container.

The front wall may be provided with a tubular support 45 for an objective and the rear wall 2 may be provided at the top and bottom with a straight channel section 6 adapted to form two guideways for the two edges of a film when it is moved from the film supply to and from a position in which it may be exposed. The camera may be equipped with a bottom wall 7 and a top wall 8, this top wall being best shown in Fig. 2. The top wall 8 is preferably provided with a downwardly extending flange 9 adapted to engage and form a light-tight joint with the upper edge 9' of the camera wall shown in Fig. 1.

The top wall carries a depending film container broadly designated as 10. This container preferably consists of a housing 11 which is substantially cylindrical and which is provided with walls 12 and 13 spaced apart leaving a light-tight exit 14 between these walls through which film may be passed. There may also be an offset rectangular spaced portion 15 of the housing which projects to one side of the cylindrical housing and which is provided with a spring support 16 carrying a roller 17 which is normally thrust towards the hub member 18 by means of the spring 16.

Thus a film F, coiled on the hub member 18, is prevented from springing away from the hub member by means of the roller 17. As indicated in Fig. 4, a film may be coiled on the film spool which may consist of a hub member 18 of wood, sheet metal, or other desirable material, in which there is preferably arranged a slot 19 between the spaced flanges 20. The end of the film coil may be entered into the slot 19 and the film may then be coiled upon the spool. The bottom portion of the spool carries a trunnion 21 adapted to fit into an aperture 22 in the bottom of the film container 10. Preferably, there is also a similar registering aperture 23 in the bottom wall 7 of the camera which will also receive this spool trunnion.

The upper end of the film spool is directly connected to the hub member 24, and there is a top flange 25 which is knurled to serve as a handle and to facilitate turning the spool.

The film F, wound upon the film spool, may be provided with a short length of backing paper or may be provided with a dyed or backed film to prevent light from fogging the inner convolutions of film as is well-known in the art. A camera user purchases a spool of film similar to the device shown in Fig. 4, excepting that the film, of course, has been wound on the spool with the light-protecting layer outermost and with the inner end of the film inserted into the slot 19.

This device is passed into the camera by merely entering the end of the film in the container 10 at the top of the camera (it being unnecessary to remove the camera top from the camera 1) by inserting the spool in the container 10 and thrusting the handle 25 downwardly until the trunnion 21 becomes engaged in the bearing apertures 22 and 23.

Thus the bottom of the spool has a bearing in the bottom of the container and preferably also in the bottom of the camera wall, and the top of the spool is also provided with a bearing which engages the top wall 8 so that the spool will be rotatably mounted in the camera.

When the spool is being moved downwardly, the pin 31 of the flange 30 which forms an integral part of the camera top 9 may be entered in the slot 28 and by turning the flange 26 the pin will move freely through the slot 27. There are two objects in having this construction. First, the spool is held against accidental removal from the camera, since it can only be removed when the slot 28 is brought into registration with the pin 31. Second, the flanges 30 of the camera top 8 and the flange 26 of the handle 25 form cooperating light-locking parts. It might also be noted that since the upper part of the spool hub at 24 is of relatively large diameter, this part may engage the inside of wall 30 to act as a trunnion for the film spool.

It should be noted that the pin 31 extends through the flange 30 and extends outwardly from the flange, but the inner end of the pin is flush with the inside diameter of the flange 30 so that the hub member 24 of the spool may freely turn in this bearing.

With this embodiment of my invention and with the parts in the assembled position above described, an operator may move film into position for exposure in two different ways. First, if desired the knurled handle 25 may be turned until all of the film has been unrolled from the hub member 18, in which case it passes through the guideways 6 into the spool chamber defined by the curved walls 4 and 5. To make exposures, the film is turned backwardly again upon the spool hub 18 making exposures one at a time as is usual with roll film cameras.

Referring to Figure 5, this figure shows a second embodiment of my invention in which the spool member differs from that shown in Figure 4 in that the hub member 118 is provided with a slot 119 and a pin 122 adapted to engage apertures 123 in the film $F^1$ the flanges 120 are spaced apart on the hub member 118 to receive film therebetween. The spacing of the apertures 123 in the film, as indicated by the letters a, b, c, d, and e, is increased by an amount equal to the increase in the length of succeeding convolutions of film wound on the hub member 118. Thus the film $F^1$ may be positively driven by the pin 122 when the hub member 118 is turned by the handle 125. This handle carries a hub portion 124 and a pin 121 exactly like the hub 24 and the pin 21 of the spool shown in Figure 4.

The second method of use consists in pushing the film into the opposite spool chamber, making exposures as the separate areas of film are moved past the exposure aperture toward the empty film chamber. After all of the film areas have been exposed and the film is unwound from but is still attached to the hub member 18, it may be rewound onto the original spool.

The construction above referred to makes possible an extremely inexpensive camera. As will be noted, the camera does not require the usual film winding key and spool centering device, and it consists of but few and simple parts.

However, my invention is not limited to a single spool roll holding camera, but a spool constructed in accordance with my invention may also be used in roll holding cameras utilizing the usual two spools. In this type of camera there is also a saving over the usual type in that the expensive film winding keys and spool centering devices may be either eliminated or may be of extremely simple type.

As illustrating such an embodiment of my invention, reference may be had to Figs. 8–12, inclusive.

As indicated in Fig. 8, the film assembly may consist of a spool hub 40 having two flanges 41 and 42 spaced apart to receive film between them, there being the usual film spool slot 43 located between the flanges.

A spool trunnion 44 extends beyond the end of one flange 41 and a spool trunnion 52 extends beyond the end of the other flange 42. There is a handle 46 provided on the end of the film core 40 which in this instance is shown as being in the form of a cup 47 having a bottom wall 48 to which the end 49 of the hub member may be riveted. This cup-shaped member resembles the structure shown in Fig. 4 in general shape and there is a depending flange 50 from the handle 46 which may carry a pin 51 adapted to move through the groove 53, being admitted to this groove in only one position as is the case with the structure shown in Fig. 7. Thus, this film spool may be loaded through the opening 54 in the top wall 55 of the camera and the flanges 56 and 50 form cooperating members which make a light-tight connection between the camera wall and the spool assembly, and in addition hold the film spool in place.

Still another embodiment of my invention is shown in Fig. 9. If it is desired to make an extremely simple type of camera as, for instance, by die-casting, the camera shown in Figs. 9 and 10 may be employed. This type of camera resembles the better known cameras in that it may consist of a two-part body 60 and 61 which may separate on a line 62 drawn through the center of the camera body. Such camera bodies are well-known.

However, this camera body differs from the usual type in that there is no winding key and in that the film assembly lies partially inside and partially outside of the camera body. The reason for this is that the structure of the camera may be greatly simplified.

As indicated in Fig. 9, the top 61 of the camera has been removed leaving the bottom 60. This portion of the camera may include the usual spool chambers 63 and 64 at each side of an exposure aperture 65. The spool chambers may be provided with suitable springs for tensioning the spool and film, 66 and 67. Each spool chamber is alike in that there is provided two bearings 68 and 69 for the film spool assemblies which are also of simple construction, that is, the spool assemblies may consist of a hub member 70 with the usual slot 71 and trunnions 72 and 73 on which the spool may turn. The hub carries three flanges 74, 75, and 76, the latter flange providing a handle by which the spool may turn.

Because the trunnion 73 is approximately the same length as the bearing 69 of the camera, and because the flanges 75 and 76 are both annular in shape and extend well beyond the trunnion 73, a light-tight connection is formed between the parts of the spool assembly lying inside and the parts of the spool assembly lying outside of the camera. In other words the spool flange 75 and the handle 76 lie parallel and since only the central portions of these members are connected by trunnion 73, light is prevented from passing through bearing 69 in which the trunnion 73 lies parallel with these parts.

With the embodiment of my invention just described, it will be evident that the camera parts can be extremely simple and that a winding key need not be provided.

It is usually desirable to prevent film from being wound through a camera in two directions. If this is considered necessary the structure shown in Fig. 11 may be used, this differing from the structure shown in Fig. 9 solely in that the film spool assembly on the hub portion 73 is provided with a ratchet 78, best shown in Fig. 12, this ratchet section being engaged by a spring 79 forming a pawl. If such a device is used, it may be placed at one end of the camera or at both ends, as may be deemed necessary.

From the above specification and from the drawings, it will be seen that the common difficulty with roll holding cameras—that of having the winding key pull out and become disengaged and that of having the winding key slot become worn—is entirely overcome. Since the handle of my improved film assembly is carried by or is an integral part of the film spool, there is no necessity of properly pushing the film winding key in the spool as the camera is being loaded. Thus, not only is loading greatly facilitated, but my device is much more certain in operation.

While my improved film assembly is primarily intended for the very small size cameras, many of which take pictures on standard motion picture film, because the difficulties of providing a winding key and a key slot in such small size spools is considerably increased, it is to be understood that my invention is equally useful with cameras of larger size.

While I have disclosed and described a number of different embodiments of my invention, it is to be distinctly understood that these are by way of illustration only and I contemplate as within the scope of my invention all such claims as may come within the scope of the appended claims.

What I claim is:

1. A photographic film assembly including a spool, said spool comprising a core, spaced flanges mounted on the core for protecting convolutions of film wound thereon, a handle spaced from one of said flanges and carried by said core, said handle being annular in shape, an annular flange between said handle and said flange, and means carried by said annular flange and carried by said handle adapted to hold said spool in a camera.

2. A film spool for use in a camera having a spool bearing extending completely through a wall of a camera to the exterior thereof, including a hub member, a pair of spaced flanges carried by the hub member between which convolutions of film and backing paper may be wound to protect film from light, a handle carried by the hub member spaced from a flange thereof and including an annular member with an edge roughened to turn the hub member, a spool trunnion carried by the hub between the handle and a spool flange and adapted to engage the spool bearing extending through the camera wall, the handle being of such a large area that it extends a material distance longitudinally over the spool trunnion whereby it serves as a light guard to prevent light from entering between the trunnion and bearing.

CHARLES Z. CASE.